United States Patent
Watzke

(10) Patent No.: US 12,076,201 B2
(45) Date of Patent: Sep. 3, 2024

(54) DENTAL BLANK, DENTAL PARTIAL PROSTHESIS AND METHOD OF MANUFACTURING A DENTAL PARTIAL PROSTHESIS

(71) Applicant: Ivoclar Vivadent AG, Schaan (LI)

(72) Inventor: Ronny Watzke, Feldkirch (AT)

(73) Assignee: Ivoclar Vivadent AG, Schaan (LI)

( * ) Notice: Subject to any disclaimer, the term of this patent is extended or adjusted under 35 U.S.C. 154(b) by 4 days.

(21) Appl. No.: 17/817,950

(22) Filed: Aug. 5, 2022

(65) Prior Publication Data
US 2023/0045917 A1 Feb. 16, 2023

(30) Foreign Application Priority Data

Aug. 10, 2021 (EP) .................................. 21190667

(51) Int. Cl.
*A61C 13/00* (2006.01)
*A61C 13/01* (2006.01)
*A61C 13/08* (2006.01)

(52) U.S. Cl.
CPC ...... *A61C 13/0022* (2013.01); *A61C 13/0004* (2013.01); *A61C 13/01* (2013.01); *A61C 13/082* (2013.01); *A61C 2201/002* (2013.01)

(58) Field of Classification Search
None
See application file for complete search history.

(56) References Cited

U.S. PATENT DOCUMENTS

| | | | |
|---|---|---|---|
| 4,970,032 | A | 11/1990 | Rotsaert |
| 2009/0026643 | A1 | 1/2009 | Wiest et al. |
| 2017/0056137 | A1 | 3/2017 | Matsui et al. |
| 2018/0071063 | A1 | 3/2018 | Watzke et al. |

FOREIGN PATENT DOCUMENTS

| | | |
|---|---|---|
| DE | 837288 B1 | 4/1952 |
| WO | 91/07141 A1 | 5/1991 |
| WO | 2013/072287 A1 | 5/2013 |

*Primary Examiner* — Elizabeth Collister
(74) *Attorney, Agent, or Firm* — Ann M. Knab; Thad McMurray

(57) ABSTRACT

A dental blank, having an upper surface and a lower surface, constructed of a flesh-coloured material and a tooth-coloured material. The flesh-coloured material and the tooth-coloured material are bonded together. The interface between the materials with elevations and depressions formed in or at the interface extends through an optionally curved plane, which plane is parallel to or oblique to at least part of the surfaces of the blank.

16 Claims, 9 Drawing Sheets

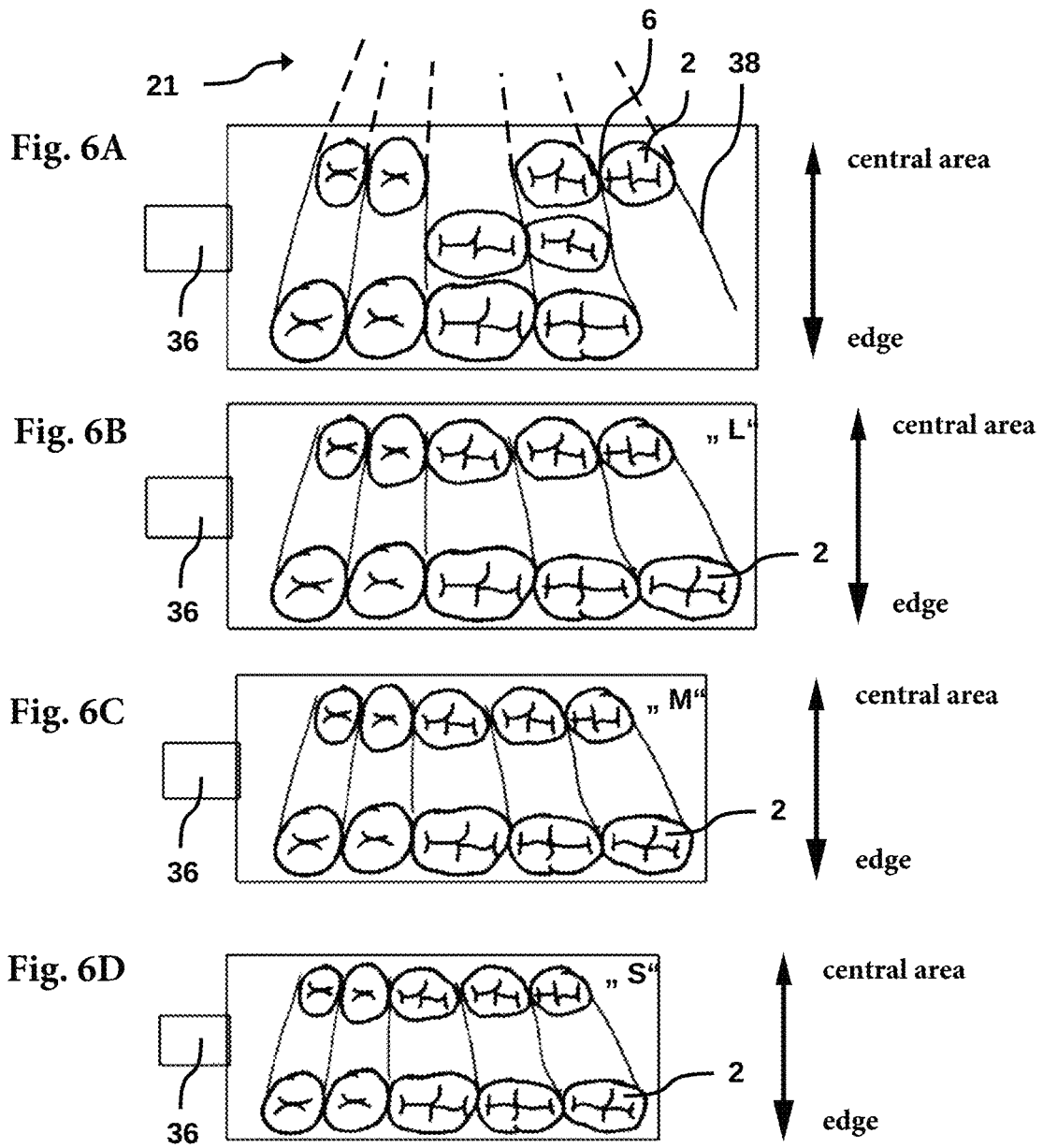

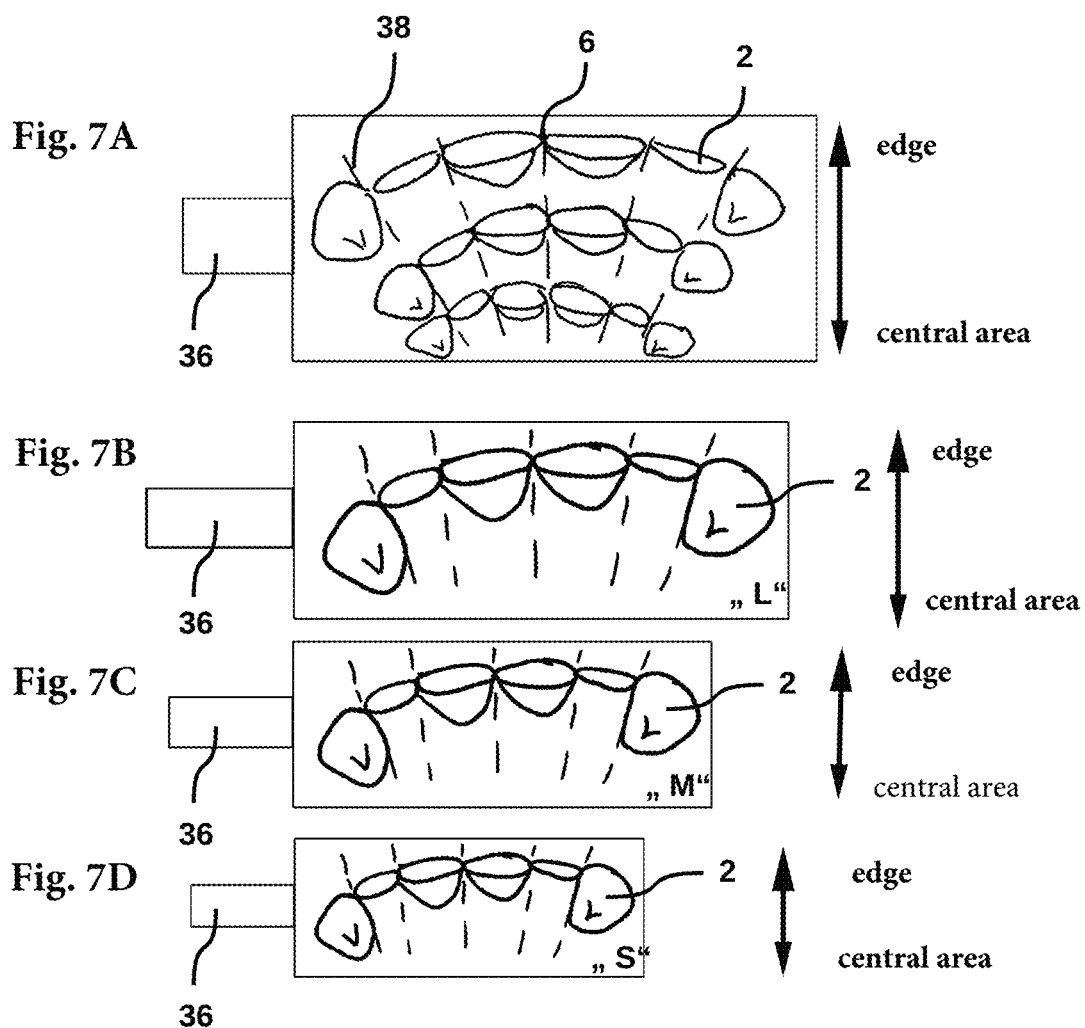

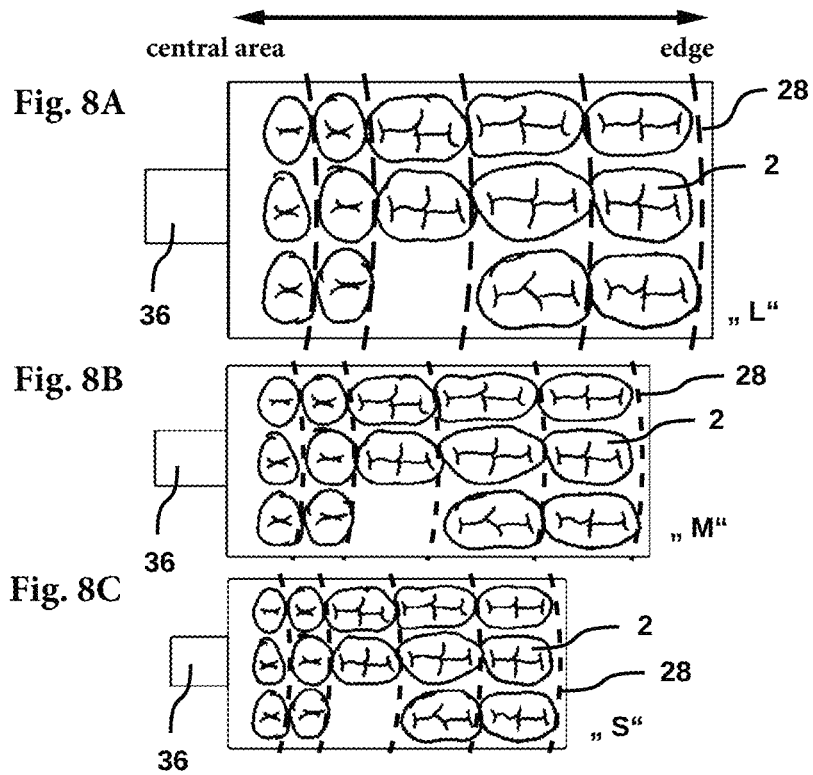
Fig. 8A
Fig. 8B
Fig. 8C
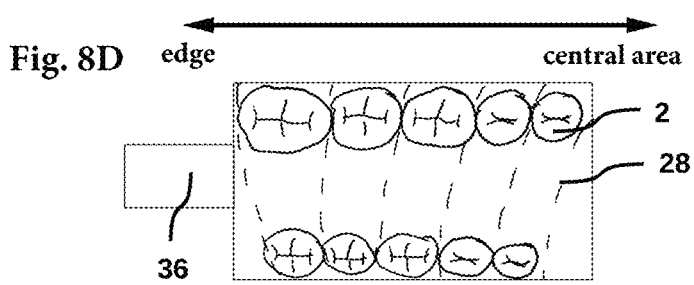
Fig. 8D
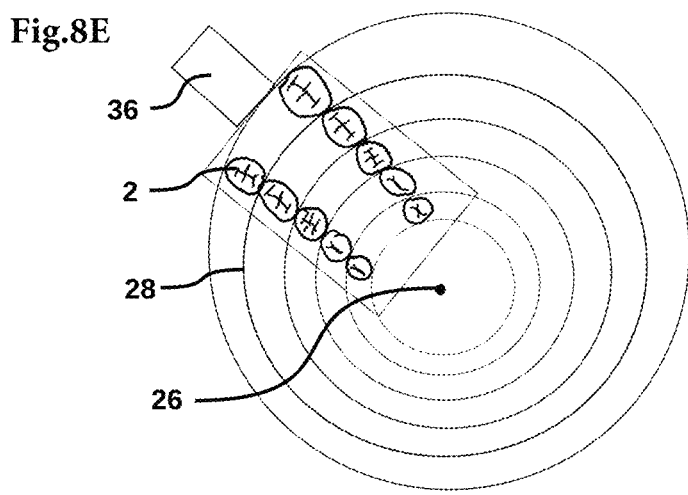
Fig. 8E

DENTAL BLANK, DENTAL PARTIAL PROSTHESIS AND METHOD OF MANUFACTURING A DENTAL PARTIAL PROSTHESIS

CROSS-REFERENCE TO RELATED APPLICATIONS

This application claims priority to European patent application No. 21190667.2 filed on Aug. 10, 2021, which disclosure is incorporated herein by reference in its entirety.

TECHNICAL FIELD

The invention relates to a dental blank and a block with an upper and a lower surface, a dental partial prosthesis and methods for manufacturing a dental partial prosthesis.

SUMMARY

It has been known for a long time to build up dentures, but also teeth, from several layers. Examples of this are the solutions known from WO 90/13268 A1 and corresponding U.S. Pat. No. 4,970,032A, which is incorporated by reference in its entirety, and WO 91/07141 A1.

For dental prostheses, on the one hand a good material compatibility and on the other hand a slim design of the prosthesis or partial prosthesis is desirable. In order to ensure a secure anchorage of the teeth in the dental prosthesis, they are typically bonded or inserted in an injection moulding process. A solution in this regard can be seen in DE 837 288 Bl.

Currently, several process steps are required for the production of such partial dentures. First, a wax model must be created. Then this wax model is replaced by the prosthesis material, for example in a casting process or via the lost-wax process. Then the partial denture is finally finished and polished. Such a multi-step process is known, for example, from WO 2007/060142 A1 and corresponding US 20090026643 A1, which is hereby incorporated by reference in its entirety.

As described, partial dentures consist of several parts and different materials. The size of partial dentures depends on the respective dental situation of a patient. Compared to a full denture, this can vary greatly from patient to patient, as each patient has a different number and extent of gaps.

As the modelling of the gingiva and tooth parts in wax and the transfer to the final denture is error-prone and time-consuming, working with several models can very easily lead to transfer errors. The fabrication of partial dentures is therefore time-consuming and highly error-prone due to the large number of materials and working steps involved.

SUMMARY

Consequently, the invention is based on the task of creating a blank for a dental partial prosthesis according to the claims and a block with an upper and a lower surface according to the claims, a dental partial prosthesis according to the claims and methods for manufacturing a dental partial prosthesis according to the claims, which on the one hand can be manufactured inexpensively and quickly and on the other hand has a lower susceptibility to errors and is also optimised with regard to storage possibilities.

According to the invention, it is provided that the partial prosthesis is manufactured from a specially designed blank or block. The blank is designed in two colours and consists of a gum-coloured (pink to reddish) material and a tooth-coloured (whitish to beige) material, in particular respectively based on plastic or a ceramic material, which are joined together in a form according to the invention. This intensive bonding can be achieved, for example, by adhesive bonding or also by polymerisation. It is also possible that the two materials are held together only by means of a pressing device, such as one or more screw clamps, but can be separated at any time.

The one-piece and inseparable production can be achieved, for example, by pressing the materials against each other in a state that is still soft—or even liquid—at the interface, so that they penetrate each other—microscopically speaking. However, even with this type of production, the transition area is in the sub-millimetre range, for example less than 100 µm thick.

During polymerisation, such a transition area also exists in the same order of magnitude, and during adhesive bonding, the adhesive joint can have a small thickness between, for example, 40 and 200 µm.

The materials preferably consist of a polymer, in particular PMMA, but other materials such as ceramics, in particular zirconium dioxide, or metals are also conceivable. It is also possible to use two different materials.

According to the invention, the blank is designed as a two-colour block or as a two-colour disc or as a substantially disc-shaped, in particular flat cylindrical, blank with an upper and a lower disc surface. Such a two-coloured disc may be, for example, a cylinder in which the height is much less than the radius. This height of the cylinder may extend along the axis of rotation of the cylinder and would be denoted $C^\infty$ in Schoenflies symbolism, where "C" means cyclic and the index denotes the countability, i.e., here $\infty$ for rotational symmetry. The plane passing through the interface between the two materials is perpendicular to the height, i.e., perpendicular to the axis of rotation of the cylinder, and therefore corresponds to a surface of revolution or rotation.

In an advantageous embodiment, a disc-shaped body is realised. This can be round, but also non-circular, in particular polygonal. A polygonal shape can be fulfilled, for example, by a flat cuboid in which one of the sides is shorter than the other two. However, other, in particular flat, polyhedra such as a uniformly equilateral octagonal antiprism or a uniformly equilateral, e.g. decagonal, antiprism are also possible.

In the case of a bicoloured block, which may be, for example, a cuboid or a polygonal disc, the plane of the interface between the two materials extends parallel to the face of the cuboid which has the largest surface area.

The interface between the materials of the blank runs along the plane but does not have to be flat or even. In a preferred embodiment, the plane in which the interface lies is arranged parallel to one of the possibly flat disc surfaces of the blank, in particular to one that has the largest surface area. However, this plane can also lie diagonally in the blank. If the disc surfaces are not flat but, for example, curved or structured, the plane can extend essentially parallel or parallel to part of the disc surface. It is also possible for the plane to be curved, especially according to the Spee curve.

The flesh-coloured material can, for example, have elevations and depressions at the interface, each of which protrudes out of the plane. The elevations and depressions are each, in particular at least partially, formed circumferentially or curved in the interface between the materials, i.e., spiral or ring-shaped or fan shaped. The course of the elevations and depressions is chosen in such a way that it extends around an inner region or the centre of the blank. It is also possible to provide a partially circumferential extension, e.g., over less than 360 degrees, or a multiple circumferential extension, e.g. over 1800 degrees, i.e. 5 revolutions.

Any degree of rotation is possible.

Each of the partial dentures is preferably machined, in particular milled, out of an area of the blank which extends over one or more elevations and depressions. However, this area can also run along a line, so that the machined out or milled out partial denture has a curvature predetermined by the course of the elevations and depressions. The apex of a depression or an elevation forms a line with a radius r, viewed from an inner region of the disc-shaped blank, in particular from its centre.

This line may be in the form of an arithmetic or logarithmic spiral or may form one or more circles.

The shape of the partial prosthesis itself can be chosen in any suitable way. Preferably it is curved, corresponding to the human dental arch.

The extension of the partial denture is preferably transverse to the peripherally (partially) circumferential extension of the elevations and depressions, i.e. also the apex of the elevations. With respect to a disc-shaped blank, the partial prosthesis can extend essentially radially, but also somewhat obliquely to the radius, e.g. deviating from the radius by +/−20 degrees.

Spirals can be described mathematically as coordinate equations in the plane polar coordinate system, where the radius r is represented as a function $r(\varphi)$ of $\varphi$; $\varphi$ generally runs to infinity instead of only to $2\pi$. In the present case, however, only infinite values are possible. Negative angles are also possible. The general polar representation of a spiral is:

$$r=r(\varphi)$$

In the x/y coordinate system, this results in points with the parameter representation $$x=r(\varphi)\cos \varphi$$

$$y=r(\varphi)\sin \varphi$$

where r is the radius and $\varphi$ is the angle of rotation. In particular, an arithmetic spiral with the equation $$r=a\varphi$$

where a is a natural number $\mathbb{R}$ and $\varphi$ is the angle of rotation. The polar representation of a logarithmic spiral is:

$$r=ae^{k\varphi},$$

where a and k are each a real number $\mathbb{R}$ and $\varphi$ is the angle of rotation.

If the parameters of the polar representation of a spiral $r=r(\varphi)$ are set appropriately, i.e., if $\varphi$ is kept constant, then one obtains a circle with the equation $$r=a,$$

where r is the radius and $\varphi$ the angle of rotation. In the x/y coordinate system, the equation is then $$r^2=x^2+y^2$$

Preferably, the tooth-coloured material has exactly the negative shape to the flesh-coloured material at the interface between the two materials. Thus, the interface between the materials has ring-shaped elevations and depressions and are, as it were, interlocked with each other. For example, the flesh-coloured material can be polymerised onto the tooth-coloured material. In another embodiment, there is a layer of adhesive, joining or composite material between the two materials to firmly bond the two materials together. It may also be particularly convenient to join the two materials by additive processes or by press-fitting or other joining techniques.

In a preferred embodiment, the pattern, i.e. the spiral or the circle or the plurality of circles, has its common centre or centres in common with the centre of the disc, in particular the centre of the blank, i.e. has/have a central and common centre. Instead of this, it is also possible to realise eccentric circles, i.e. those with different centres, and/or to provide the centres of these and/or the starting point of the spiral in an inner area of the disc-shaped blank, i.e. for example in the inner quarter, in the inner third or in the inner half of the blank.

If the blank is viewed in cross-section through both materials, i.e. perpendicular to the plane, where it is assumed here that the flesh-coloured material is at the bottom and the tooth-coloured material is at the top, and which cross-section preferably passes through the centre of the blank, the flesh-coloured material shows elevations and depressions at the interface which are preferably not symmetrical. The elevations of the flesh-coloured material are rather tapered, whereas the depressions of the flesh-coloured material are rather rounded. In this respect, when viewed from the side, there are crests and sloping surfaces extending downwards from them, forming slopes and ending in valleys. This design essentially corresponds to the human gum line, which is formed by a string of Us or a chain line.

In this cross-section, the tooth-coloured material shows exactly the negative shape to the flesh-coloured material at the interface between the two materials. This supports the strength and resistance of the connection, in particular of an adhesive joint, between the two materials against forces acting thereon, for example during further processing of the blank, but also during everyday use of the final partial denture.

In a preferred embodiment, the elevations and depressions become wider and also higher from the centre point outwards. The rings thus run in cross-section from the inner region of the blank or from the centre towards the edge with a changing amplitude and/or frequency. Partial dentures which are machined, in particular milled, in the outer area of the blank, thus automatically have larger dimensions than partial dentures which are machined, in particular milled, near the centre of the blank. However, it is also possible to provide the dental restoration parts for molars on the inside and for premolars on the outside, i.e. to reverse the size distribution in this respect. Typically, molars and premolars are needed more often than canines and incisors, and according to the invention, the outer area of the disc-shaped blank offers more space for the arrangement of the molars and premolars, which in this respect harmonises with the need.

In a further embodiment according to the invention, it is provided that the tooth-coloured material is designed with a colour gradient. In this case, it is envisaged that a darker shade is selected for the tooth-coloured material at the interface between the two materials and that the shade changes in such a way that it lightens with increasing distance from the flesh-coloured material.

In another embodiment, the interface between the materials of the blank is shaped in the form of concentric circles, comparable to the pattern produced by a droplet when it falls into a liquid. The radius of the respective ring-shaped elevations and depressions increases from the centre point outwards, i.e. towards the edge of the blank. Furthermore, it is possible that the rings become larger, and preferably wider, from the centre point outwards. It is also possible that the rings are closer together near the centre point and gradually further apart towards the outside, i.e. the distance between the rings gradually increases from the centre point towards the outside. In a further embodiment, the elevations and depressions become wider and/or higher from the inside to the outside.

In another embodiment, the interface between the materials of the blank is spiral-shaped and three-dimensional. This means that, starting at the centre, the elevations and depressions extend spirally outwards, i.e. towards the edge of the blank. Furthermore, it is possible that the spiral formed by the elevations and depressions, i.e. also the elevations and depressions themselves, becomes larger from the centre point outwards, i.e. preferably wider and/or higher. This design can be compared to an ammonite or a snail shell. As a mathematical equation, one would best describe this pattern with a logarithmic spiral in polar coordinates $(r(\varphi), \varphi)$. For a, $k \in \mathbb{R}$ the equation describes $$r(\varphi)=ae^{k\varphi}, \varphi \in \mathbb{R}$$

a function r: R→R, and by means of the polar coordinate interpretation a logarithmic spiral in the Euclidean plane. The parameter k is called the gradient of the spiral. The k can also be expressed by tan α, in which case $\alpha \in ]-\pi/2, \pi/2[$ is called the pitch angle. In Cartesian coordinates this results in:

$$x(\varphi)=r(\varphi)\cos \varphi = ae^{k\varphi} \cos \varphi$$

$$y(\varphi)=r(\varphi)\sin \varphi = ae^{k\varphi} \sin \varphi$$

In a further embodiment, the centre of the pattern at the interface between the materials of the blank is not central, i.e. does not coincide with the centre of the interface plane. Rather, it is displaced in this plane. The rings may remain unaffected by this, so that this form of embodiment is merely a displacement. However, the displacement of the centre point may also involve a compression of the rings on one side and a simultaneous stretching on the opposite side. In this embodiment, the width of the elevations and depressions is automatically changed, but their height may change or remain the same.

In another embodiment, the spiral line or the concentric circles are wavy or curved. A serrated design or a combination of serrations and waves would also be conceivable. The spiral line or the concentric circles, along which the peaks of the elevations or depressions of a material run, can thus have waves or serrations pointing sideways—i.e. towards the centre and/or edge of the blank—in the plane in which the respective line lies. In this way, the blank can be adapted even more closely to the geometry of natural teeth.

According to the invention, a large number of partial dentures, even for different patients, can be produced precisely from one blank without the use of (wax) models. This thus ensures the exclusion of transfer errors and, at the same time, optimal material properties.

According to the invention, the two-colour design of the blank means that it is no longer necessary to join the gingival area and the tooth portion.

The preferred design according to the invention, namely the intensive connection of the tooth-coloured and the flesh-coloured material of the blank, results in the advantage that the milling work can be carried out much faster. Only one clamping is required for the machining process of both materials. Due to the intensive connection between the tooth-coloured and the flesh-coloured material and due to the form-fit between them, the strength of the connection is surprisingly also sufficient for the milling operation and the forces applied there.

It is particularly advantageous that the one-piece prosthesis can be automatically finished by a mechanical machining process, in particular by milling in a CAD/CAM unit, with the integration of a control device. With this control device, the exact position of the partial prosthesis in the blank can be determined automatically and/or under user control.

A CAD/CAM device completes the dental partial denture by determining the exact placement of the partial denture in the blank based on patient-specific data, in particular patient-specific tooth sizes and widths, and creates the denture based on this. In this way, the size of the partial denture is determined patient-specifically, and different shapes of the respective dental arch part can also be taken into account, for example, different curvatures of different dental arches, thus insofar different tooth courses. The provision of the required patient data is carried out as follows:

First of all, the patient's dental situation is recorded by means of a conventional intraoral scan or an impression with a subsequent 3D scan and sent to the control device. This marks anatomically relevant points or anatomical points in the relevant area for the subsequent partial denture. These points serve as reference points. Furthermore, the control device determines individual tooth shapes, the rotation and/or the angulation of the teeth and the shape of the base of the partial denture based on the patient's oral situation recorded by a scanning device.

This data is fed to the software of the CAD/CAM device. First, the data of the upper and lower jaw models are imported and positioned correctly in relation to each other. On this basis, all parts of a partial denture, such as the model casting framework, retaining elements, gingival area and teeth, can be calculated. The modelling of the transition between the gingiva and the tooth is simplified by the design of the blank according to the invention and does not require any complex wax models or time-consuming joining. Subsequently, the CAD/CAM device automatically creates a proposal for a partial prosthesis, a so-called virtual partial prosthesis, with its control device and makes a suggestion as to where on the blank this could be optimally produced. However, the virtual partial denture and also the suggested placement can be modified by the user, e.g. by the dental technician, on the CAD/CAM device.

After completion of the CAD/CAM model of the partial denture, the finished design is split into different exports. These are, on the one hand, CAD/CAM data sets for the framework and the associated retaining elements, which can be manufactured from metal or other materials additively (e.g. laser melting) or subtractively (e.g. milling). On the other hand, there are CAD/CAM data sets for the flesh-coloured portions (gingival portions) and for the dental portions, which can subsequently be manufactured or milled in a simple manner from the blanks according to the invention. Due to the design of the blanks, several gingiva and tooth parts or several data sets of different patients can be produced from one blank.

In a preferred embodiment, each blank is provided with an individual identification feature, such as a QR code, and also has reference points that allow exact positioning in the CAD/CAM device. Alternatively, it is also possible to implement this by means of an RFID chip. Surprisingly, this also applies when the blank is removed from the device and later clamped again. After a partial prosthesis has been produced from the blank, the control device stores the exact position of the machined area of the blank with the help of the reference points on the blank and the individual identification feature of the blank. Thus, the control device automatically knows on which blank which area is still unused and automatically suggests a suitable blank for a virtual partial denture as well as an optimal placement on it.

It is also possible to use the CAM data of already manufactured blanks for nesting. Furthermore, it is possible to provide a camera in the milling machine that is directed at the blank to be machined, possibly partially milled, and provides information about the available areas of the blank via image recognition.

It is also possible for the control device to carry out a so-called nesting of several virtual partial dentures on one or more blanks, in order to optimise the utilisation of material. For this purpose, the control device optimises the position of the respective virtual partial dentures and, in particular, also takes into account partially processed blanks. If an optimal placement is not possible, or if there are no longer enough new blanks, the software emits a corresponding warning signal.

If the control device has determined an optimal placement, it suggests it to the user, for example by means of a pop-up window, so that the user can confirm it. However, it is also possible to automatically forward the placement to the CAD/CAM device without requiring confirmation from the user. In this case, the determined data are automatically released for further processing and are forwarded to a milling machine of the CAD/CAM device for the production of the partial prosthesis, in which a two-colour blank according to the invention, in particular a two-colour blank that has already been partially processed, is or will be clamped and produces the desired partial prosthesis.

In a modified embodiment, it is provided that during the milling process, connecting webs remain between the partial prosthesis to be produced and the rest of the blank, so that the partial prosthesis can be prevented from falling out during the milling process, even if the blank should be rotated or tilted in three-dimensional space. This allows any conventional milling machine to be used for a blank according to the invention without requiring further special modifications to the milling machine.

Based on the patient data obtained, the control device allows the individual tooth shape to be determined, as well as the rotation and angulation of the teeth, and also the shape of the base of the partial denture, so that partial dentures can be realised for every conceivable dental situation of a patient.

Due to the second design according to the invention, i.e., the pattern according to the invention consisting of elevations and depressions at the interface between the materials, in particular the course of the crests of the elevations and depressions in the form of a spiral pattern, a snail shell pattern or a pattern in the form of concentric circles, the sizes of the tooth arch parts or individual teeth are predetermined by the design. Depending on the different radii and distances of the of elevations and depressions as well as depending on the height and width of the elevations and depressions in the blanks, different tooth heights and widths can be realised in a simple and cost-effective way. Thus, near the centre, small tooth arch parts or teeth can be realised, because there the radii of the concentric circles or the spiral are small and the "circles" or the windings of the spirals are close together. Also, the elevations and depressions can be less pronounced than in the outer area of a blank according to the invention. In this respect, it is favourable to realise large dental arch parts or teeth there. Thus, many clinical situations, such as different interdental gap lengths, different tooth sizes and different tooth segments, can be individually and monolithically finished in partial dentures from a blank block or a blank disc, so that the manufacturing process of partial dentures can be significantly simplified with these blanks as well as an automated manufacturing process.

An inventive interface between the materials can also be in the form of a double spiral. In this embodiment, the course of the elevations, in particular the course of the apex of the elevations, of the flesh-coloured material is formed as a first spiral. The course of the depressions, in particular the course of the apex of the depressions, of the flesh-coloured material is worked out as a second spiral. These two spirals thus lie, preferably offset by the same value, above and below the plane of the interface between the materials of the blank.

In this design, the first spiral runs between the teeth when the partial denture is finished and the second spiral defines the area of the respective tooth that has the highest height in the finished partial denture. Preferably, the two spirals converge to each other at a certain point, especially the centre. Furthermore, the distance between the two spirals is smaller in the inner region of the blank than in the edge region of the blank and preferably increases constantly from the inside to the outside.

In a further embodiment, it is provided that the plane of the interface between the materials of the blank itself is not flat but has a curvature. In this case, the interface between the materials of the blank can be compared to a vault, a cone or a pyramid. The course of the elevations and/or depressions of the flesh-coloured material can also, in the case of such a formation of the interface, take all the forms described above, such as a logarithmic spiral or concentric circles.

In the case of such a curved interface in combination with a spiral configuration of the course of the elevations and/or depressions of the flesh-coloured material, the configuration of the interface can be compared to the upper side of a snail shell.

It is also possible to realise blanks of different sizes, i.e. blanks with different overall sizes, comparable to ready-made sizes such as "L", "M" or "S".

It is particularly advantageous that, due to the annular design according to the invention and the alternating elevations and depressions in cross-section, each elevation of the tooth-coloured material in the finished partial denture follows the visible edge of the tooth at its neck opposite the gingiva formed by the flesh-coloured material. The resemblance to natural teeth and gums is surprisingly simple in that the flesh-coloured material is at least partially removed, in particular by milling, to such an extent that on the vestibular side the dividing line between the crown-milled tooth-coloured and flesh-coloured materials recedes as a gingival line, in particular opposite both the flesh-coloured and the otherwise tooth-coloured materials. In this way, the finished partial denture is hardly distinguishable from the surrounding teeth.

By designing the interface between the tooth-coloured and the flesh-coloured material according to the invention, several partial dentures of different (tooth) sizes can be made from one blank. The smaller the teeth need to be, especially partial dentures for children or adolescents, the closer to the centre of the blank according to the invention this partial denture is positioned, as the pattern is narrower there and the height and width of the elevations and depressions are less pronounced than at the edge of the blank.

If an uneven tooth size is required, for example to realise a transition from molars to incisors, the virtual partial denture can also be positioned obliquely, i.e. radially, in the blank. If extremely large tooth sizes are to be realised, the outer edge of the blank is preferred.

Surprisingly, this makes it possible to provide aesthetically particularly successful prostheses even with very different tooth sizes.

According to the invention, it is particularly advantageous that in this manufacturing process the individual teeth of a partial denture remain connected to each other via connecting points made of tooth-coloured material. Surprisingly, this makes it possible to improve the resistance to chewing forces, i.e. in particular to lateral shearing forces, compared to conventional partial dentures which bond conventional individual teeth into a base.

After a final polish, the finished partial denture can be delivered to the dentist for insertion.

While individually manufactured and fabricated teeth are typically accommodated in tooth cavities in a denture base manufactured according to the state of the art and, due to the leverage effect of the chewing forces during mastication, are subjected to considerable shear stresses which also place a heavy load on the bonding surface, it is intended according to the invention to minimise these shear forces by means of the design of the partial denture according to the invention, in particular the special design of the interface between tooth-coloured and flesh-coloured material, and the connection of the teeth to form a bridge extending over the entire partial denture. According to the invention, the feared loosening of the bonding of the single tooth is eliminated, because the connection of at least two adjacent teeth of the partial dentures reveals lower shear stresses due to the increased bonding surface during mastication.

According to the invention, the flesh-coloured and tooth-coloured materials are intensively bonded together, either by adhesive bonding, or by polymerisation, or by one-piece fabrication.

In the case of two-part manufacture, it is advantageous that the two materials can be joined together at any time and also in any selection to match each other. The individual parts can also have matching geometric shapes, so-called positioning elements. These can be automatically suggested and placed on the virtual partial denture by the CAD/CAM device with its control device, or they can be determined by the user, e.g. by the dental technician, on the CAD/CAM device.

The first or "wave-drop" design according to the invention has a pattern at the interface between the materials in the form of concentric circles, whereby the sizes of the dental arch parts or individual teeth are predetermined by the design. This design of the pattern at the interface between the two materials is comparable to the wave pattern produced by a drop of water when it hits a water surface.

Also possible according to the invention is a pattern in which the distances between the circles increase towards the edge of the interface or which consists of circles in which the centre of the innermost circle is displaced towards the edge of the interface and the distances between the circles are "compressed" in this direction and "stretched" in the other direction.

The second or "snail shell" design according to the invention has a spiral pattern at the interface between the materials. This spiral line can be arithmetic or logarithmic, i.e. comparable to the pattern of a snail shell.

The blank according to the invention thus makes it possible in a simple and cost-effective manner to produce a partial denture according to patient-specific requirements without having to resort to costly wax models. Transfer errors are thus avoided from the outset and the manufacturing process is optimised.

BRIEF DESCRIPTION OF THE DRAWINGS

Further advantages, details and features will be apparent from the following description of several embodiments of the invention with reference to the drawings.

FIG. 6A shows schematic representations of a first design of a posterior tooth blank according to the invention in top view and possible positioning of partial dentures of different sizes;

FIG. 6B shows schematic representations of a further design form of a posterior tooth blank of size "L" according to the invention in top view and possible positioning of partial dentures of different sizes;

FIG. 6C shows schematic representations of a further design form of a posterior tooth blank of size "M" according to the invention in top view and possible positioning of partial dentures of different sizes;

FIG. 6D shows schematic representations of a further design form of a posterior tooth blank of size "S" according to the invention in top view and possible positioning of partial dentures of different sizes;

FIG. 7A shows schematic representations of a first design of an anterior tooth blank according to the invention in top view and possible positioning of partial dentures of different sizes;

FIG. 7B shows schematic representations of a further design form of an anterior tooth blank of size "L" according to the invention in top view and possible positioning of an anterior partial denture arch;

FIG. 7C shows schematic representations of a further design form of an anterior tooth blank of size "M" according to the invention in plan view and possible positioning of an anterior partial denture arch;

FIG. 7D shows schematic representations of a further design form of an anterior tooth blank of size "S" according to the invention in plan view and possible positioning of an anterior partial denture arch;

FIG. 8A shows a schematic representation of a first design of a posterior tooth blank of size "L" according to the invention in top view and possible positioning of partial dentures of different patient data;

FIG. 8B shows a schematic representation of a further design form of a posterior tooth blank of size "M" according to the invention in top view and possible positioning of partial dentures of different patient data;

FIG. 8C shows a schematic representation of a further design form of a posterior tooth blank of size "S" according to the invention in top view and possible positioning of partial dentures of different patient data;

FIG. 8D shows a schematic representation of a further design form of a posterior tooth blank according to the invention in top view and possible positioning of partial dentures of different sizes;

FIG. 8E shows a schematic representation of a further design of a posterior tooth blank according to the invention in a top view and possible positioning of partial dentures of different sizes in relation to a disc-shaped blank according to the invention.

DETAILED DESCRIPTION

Figure 1A:
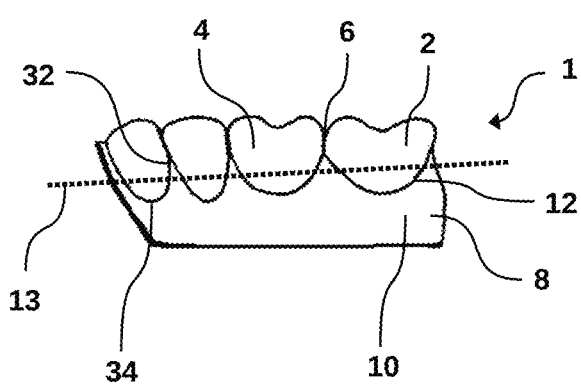
FIG. 1A shows a schematic section through a partial denture part or tooth/gingiva part manufactured according to the invention, consisting of a gingiva-coloured and a tooth-coloured material in a first embodiment.
Figure 1B:
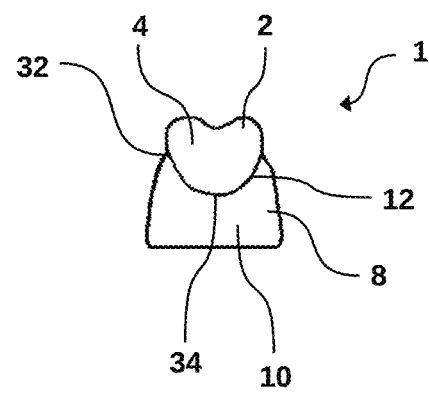
FIG. 1B shows a schematic section through a partial denture part or tooth/gingiva part manufactured according to the invention, consisting of a gingiva-coloured and a tooth-coloured material in a further embodiment.

FIGS. 1A and 1B show a schematic section through a tooth/gingiva part 1 according to the invention. Here the teeth 2 consist of tooth-coloured material 4 and the gingiva part 8 of flesh-coloured material 10. The two materials are intensively bonded to each other at their interface 12, in particular polymerised or glued to each other. FIG. 1*a* shows a multi-part, in this case a four-part, tooth/gingiva part, whereby the teeth 2 can be connected to one another by connecting points 6, and FIG. 1B shows a one-part tooth/gingiva part, a so-called single-tooth prosthesis.

The tooth/gingiva parts 1 as shown in FIGS. 1A and 1B—are manufactured from a flat cylindrical or disc-shaped, two-coloured blank. This is, for example, disc-shaped, whereby the plane 13 passing through the interface 12 between the two materials runs perpendicular to the height, and thus perpendicular to the axis of rotation C∞ of the disc. In FIG. 1A the plane 13 is shown at a side perspective. Contrary to the illustration in FIG. 1A, the plane 13 can also run at an angle or even be curved. The blank can also be block-shaped. In this case, the plane 13 passing through the interface 12 between the two materials preferably runs horizontally in the blank lying flat. In another embodiment, a plane 13 passing through the interface 12 and running obliquely in the blank is realised, and thus also an interface 12 running obliquely in the blank.

The interface 12 between the materials of the blank has a sequence of annular elevations 32 and depressions 34, which in particular may have their centres in common with the centre of the plane and each project out of the plane. At the interface 12 between the two materials, the tooth-coloured material 4 has exactly the negative shape to the flesh-coloured material 10. Thus, the interface 12 between the materials has annular elevations 32 and depressions 34, with the two materials interlocking. Transitions extend between these, forming sloping surfaces or, as it were, slopes.

If the blank is viewed in cross-section through both materials, i.e., perpendicular to the plane of the interface 12, whereby it is assumed here that the flesh-coloured material 10 is at the bottom and the tooth-coloured material 4 is at the top, and said cross-section preferably passes through the centre of the blank, the elevations 32 and depressions 34 of the flesh-coloured material 10 at the interface 12, i.e., when reflected at the plane 13, are not symmetrical. Rather, the elevations 32 are more tapered, with the depressions 34 being more rounded. This design of the interface 12 corresponds to the human gum line and is therefore chain line shaped when viewed from the side and can be likened to a string of Us.

The interlocking supports the strength and resistance of the connection of the tooth-coloured material 4 with the flesh-coloured material 10, in particular in the case of a connection via an adhesive joint, against forces acting thereon, for example during further processing of the blank, but also during everyday use of the final partial denture. The asymmetry of the interface, on the other hand, allows easy fabrication of tooth/gingiva parts 1, which have a particularly natural appearance, since the tapering elevations 32 of the flesh-coloured material 10 automatically resemble the natural course of the gums in the interdental region. The rounded depressions 34 of the flesh-coloured material 10, i.e., the rounded elevations of the tooth-coloured material 4 in the negative form, provide the natural tooth shape. In order to achieve a natural appearance, the tooth/gingiva parts 1 thus only have to be milled out of the blank at optimal points, whereby only a finishing milling of the gingival margin at the transition area between flesh-coloured and tooth-coloured material (4, 10) is necessary as final finishing.

FIGS. 2A, 2B, 2C and 2D show schematic representations of possible embodiments of the inventive interface 12 between the tooth-coloured material 4 and the flesh-coloured material 10.

Figure 2A:
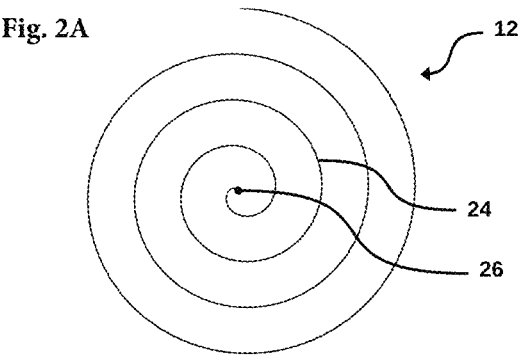
FIG. 2A shows schematic representations of a first embodiment of the inventive interface between the tooth-coloured material and the flesh-coloured material.
Figure 2B:
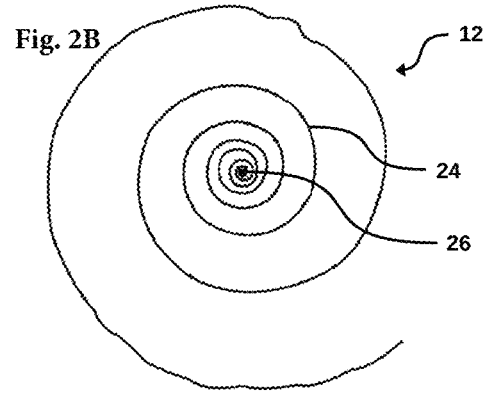
FIG. 2B shows schematic representations of a further embodiment of the inventive interface between the tooth-coloured material and the flesh-coloured material.

FIGS. 2A and 2B show a schematic representation of an inventive interface 12 between the materials 4 and 10, which in this case shows a line pattern in the form of an arithmetic (FIG. 2A) or a logarithmic (FIG. 2B) spiral. The representation in FIG. 2B can be compared with the shell shape of an ammonite or a snail shell. The spiral 24, winds from a certain point 26, in particular the centre of the plane 13 in which the interface 12 lies, outwards, i.e., towards the edge of the blank. The elevations 32 of the flesh-coloured material run along the lines of the spiral 24 and the depressions 34 of the flesh-coloured material 10 between the lines. Furthermore, it is possible that the elevations 32 and the depressions 34 of the flesh-coloured material 10 become larger and/or wider from the centre point 26 outwards. FIG. 2B shows a slightly wavy course of the spiral line, i.e., a spiral line 24 that is not perfectly geometrical. This makes it possible in a simple way to allow further size variations of the tooth/gingiva parts 1 to be produced and in particular to realise irregular deviations of the tooth sizes in the course of a partial denture—as is quite often the case with natural teeth.

Figure 2C:
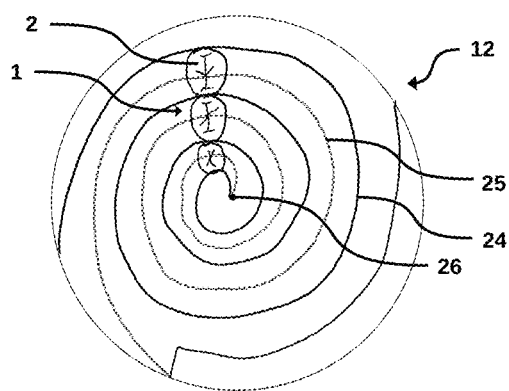
FIG. 2C shows schematic representations of a further embodiment of the inventive interface between the tooth-coloured and the flesh-coloured material and possible positioning of teeth of different sizes.

FIG. 2C shows the schematic representation of an inventive interface 12 between the materials 4 and 10, whereby in this embodiment the course of the elevations 32, in particular the course of the apex of the elevations 32, of the flesh-coloured material 10 is shown by means of a solid line 24 and the course of the depressions 34, in particular the course of the apex of the depressions 34, of the flesh-coloured material 10 is shown as a dashed grey line 25. Here it is shown how an exemplary tooth/gingiva part 1, which in this case comprises three teeth 2 as an example, can be arranged in the blank. The line 24, which represents the course of the elevations 32, in particular the course of the apex of the elevations 32, of the flesh-coloured material 10, thus runs between the teeth 2 of the tooth/gingiva part 1. The line 25, which represents the course of the depressions 34, in particular the course of the apex of the depressions 34, of the flesh-coloured material 10, defines the region of the respective tooth which has the highest height in the finished partial denture.

Furthermore, the lines 24 and 25 make it possible in a simple manner to shape or design the catenary or the Us in such a way that the shape, in particular the gingival line, of the human gums is imitated almost true to nature.

Figure 2D:
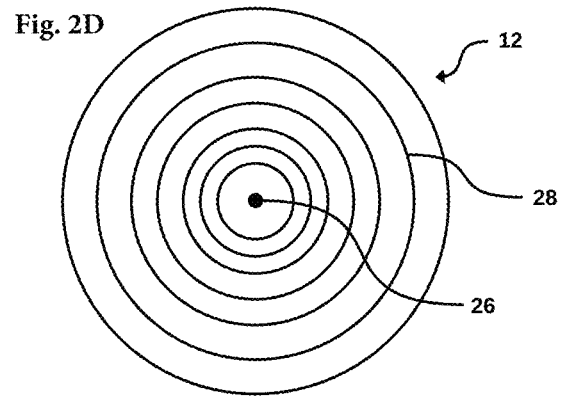
FIG. 2D shows schematic representations of a further embodiment of the inventive interface between the tooth-coloured and the flesh-coloured material.

FIG. 2D shows a schematic representation of an inventive interface 12 between the materials 4 and 10, which is designed here in the form of concentric circles 28 around a common centre 26. This is comparable to the pattern produced by a drop falling into a liquid. The elevations 32 of the flesh-coloured material here run along the lines of the concentric circles 28 shown and the depressions 34 of the flesh-coloured material between the lines. Furthermore, it is possible that the distance between two circles gradually increases with increasing distance from the centre point 26 and also that the elevations 32 and depressions 34 along or between the circles, respectively, gradually become larger and/or wider towards the outside.

Figure 2E:
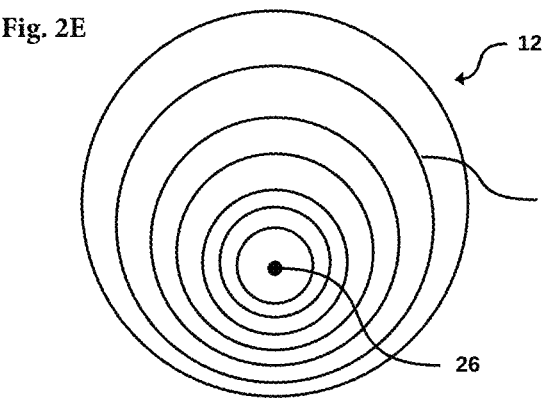
FIG. 2E shows schematic representations of a further embodiment of the inventive interface between the tooth-coloured and the flesh-coloured material.

FIG. 2E shows a schematic representation of an inventive interface 12 between the materials 4 and 10, which is designed here in the form of upset circles 28 around a centre point 26 of the innermost circle, whereby the centre point here is not located in the centre of the interface but being displaced towards an edge of the blank.

Figure 2F:
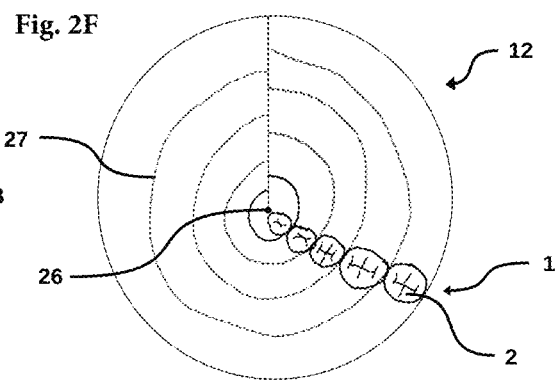
FIG. 2F shows schematic representations of a further embodiment of the inventive interface between the tooth-coloured and the flesh-coloured material and possible positioning of teeth of different sizes.

FIG. 2F shows a schematic representation of an inventive interface 12 between the materials 4 and 10, which here takes the form of several curved lines 27 around a central point 26 of the blank, whereby here the curved lines 27 neither join to form circles nor form a complete spiral over the entire interface 12 of the blank.

Figure 3A:
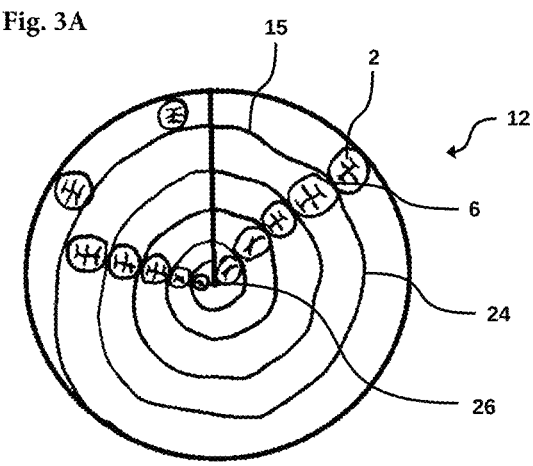
FIG. 3A shows schematic representations of a first embodiment of the inventive interface between the tooth-coloured and the flesh-coloured material and possible positioning of teeth of different sizes.
Figure 3B:
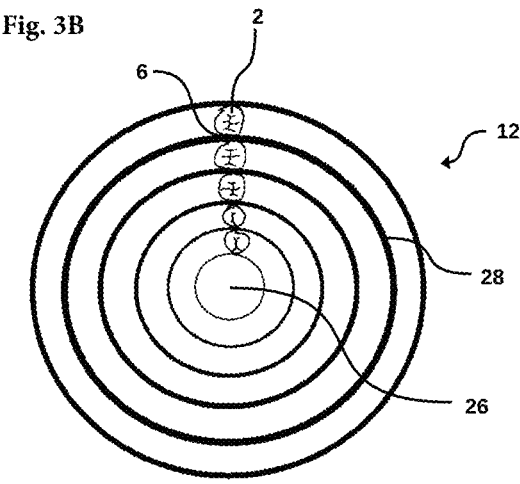
FIG. 3B shows schematic representations of a further embodiment of the inventive interface between the tooth-coloured and the flesh-coloured material and possible positioning of teeth of different sizes.
Figure 3C:
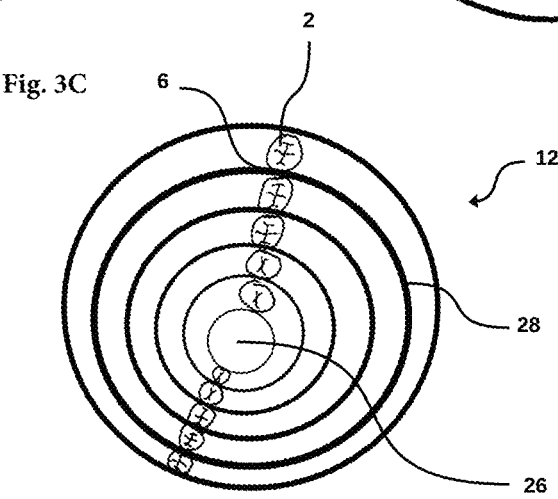
FIG. 3C shows schematic representations of a further embodiment of the inventive interface between the tooth-coloured and the flesh-coloured material and possible positioning of teeth of different sizes.

FIGS. 3A to 3C show the analogous schematic representations of possible designs to FIGS. 2A to 2C, whereby possible positioning of teeth 2 are now drawn into the representation of the boundary layer 12.

FIG. 3A shows a spiral line 24, which indicates the course of the maxima of the elevations 32. This spiral line 24 can, for example, be an arithmetic or logarithmic spiral. Furthermore, it is also possible according to the invention that the spiral line 24 does not run perfectly geometrically, but can have slight undulations 15, as shown in FIG. 3A, comparable to the undulated course of the spiral line in FIG. 2B and with the same advantages.

In FIGS. 3A and 3B the possible tooth size of tooth/gingiva parts to be produced increases from the centre 26 of the spiral line 24 (in FIG. 3A) or the concentric circles 28 (in FIG. 3B) outwards, i.e., towards the edge of the blank. The smaller the teeth 2 need to be, the closer they are positioned to the centre 26 of the blank according to the invention, since the pattern is narrower there and the height and width of the elevations 32 and depressions 34 are less pronounced than at the edge of the blank. If an uneven tooth size is required, for example to realise a transition from molar to incisor teeth, the virtual tooth/gingiva part can also be arranged obliquely, i.e., radially, in the blank. If extremely large tooth sizes are to be realised, the outer edge of the blank is preferred.

Surprisingly, this makes it possible to provide aesthetically particularly successful tooth/gingiva parts even with very different sizes of teeth 2.

In the embodiment according to FIG. 3C, the centre point 26 is not in the centre of the interface 12 but is shifted towards an edge of the blank. In this case, smaller tooth sizes can be arranged in particular on the side of the centre point 26 where there is less distance to the edge, i.e., the compressed side, so to speak. Larger tooth sizes, on the other hand, can be arranged on the stretched side.

Figure 4A:
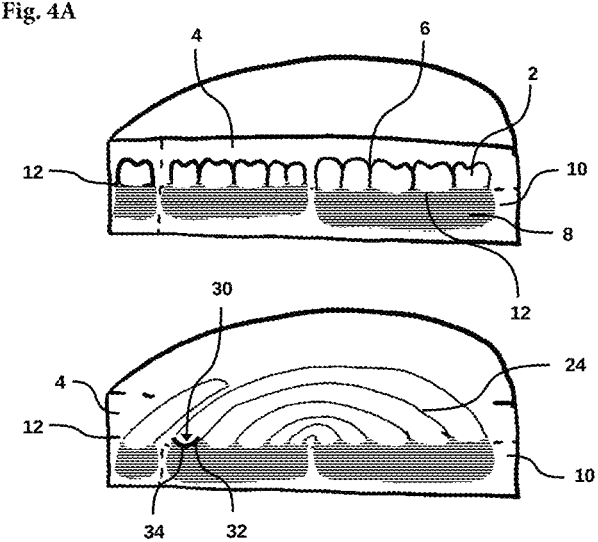
FIG. 4A shows a schematic section through a blank according to the invention in perspective view in a first embodiment.

FIGS. 4A and B show a schematic section through a blank according to the invention in perspective view in one embodiment each.

In FIG. 4A, a schematic section through a blank according to the invention with an embodiment of the interface 12 in the form of a spiral 24 is shown in perspective view. In FIG. 4A above, possible placements of several virtual tooth/gingiva—24 parts are shown. The teeth 2, in particular connected by joints 6, consist of tooth-coloured material 4 and the denture base 8 of flesh-coloured material 10. The two materials are intensively bonded to each other at their interface 12, in particular polymerised or glued to each other.

FIG. 4A below shows the design and arrangement of the interface 12 in a blank according to the invention in the form of a spiral 24 in perspective view. Here, the three-dimensional configuration of the flesh-coloured material 10 at the interface between the materials 4 and 10 is shown.

The elevations 32 and depressions 34 of the flesh-coloured material 10 are similar in configuration to those shown in FIG. 2A-2F, wherein the tooth-coloured material 4 may form the negative mould for the production of the flesh-coloured material 10. Viewed in the direction from the inside to the outside, the elevations 32 and depressions 34 of the flesh-coloured material 10 alternate with each other. The elevations 32 form crests which are followed by slopes or inclined surfaces. Viewed in this view, the interface 12 forms a catenary or string of Us. When viewed from above, the vertices or elevations 32 form concentric circles. The distance between the circles can be the same, but in the embodiment shown, it is different, e.g. larger on the outside than on the inside.

Figure 4B:
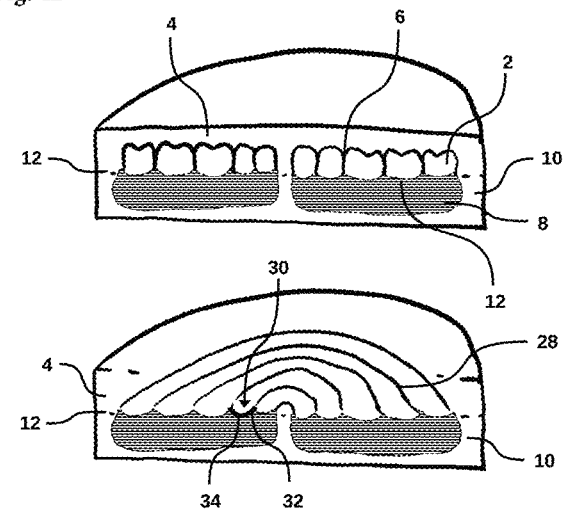
FIG. 4B shows a schematic section through a blank according to the invention in perspective view in a further embodiment.

In FIG. 4B, a schematic section through a blank according to the invention with a configuration of the interface 12 in the form of concentric circles 28, analogous to FIG. 2B or 3B, is shown in perspective view. In FIG. 4B above, possible placements of several virtual tooth/gingiva parts are drawn. The teeth 2, in particular connected by joints 6, consist of tooth-coloured material 4 and the denture base 8 of flesh-coloured material 10. The two materials are intensively bonded to each other at their interface 12, in particular polymerised or glued to each other.

FIG. 4b below shows the design and arrangement of the interface 12 in a blank according to the invention in the form of concentric circles 28 in perspective view. As in FIG. 4A below, the three-dimensional configuration, in particular comparable to a string of U's 30, of the flesh-coloured material 10 at the interface between the materials 4 and 10 is shown here.

Figure 5A:
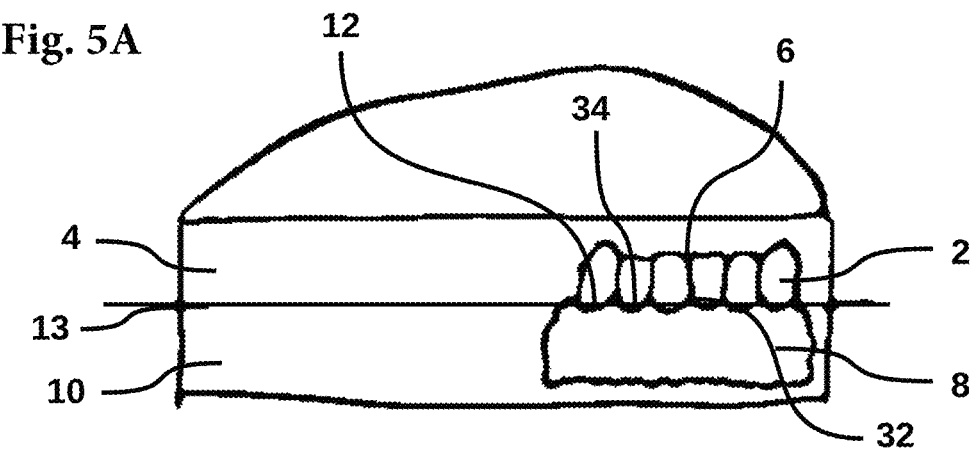
FIG. 5A shows a schematic section through the blank according to the invention in perspective view in a first embodiment with possible placement of a virtual mandibular anterior partial denture.
Figure 5B:
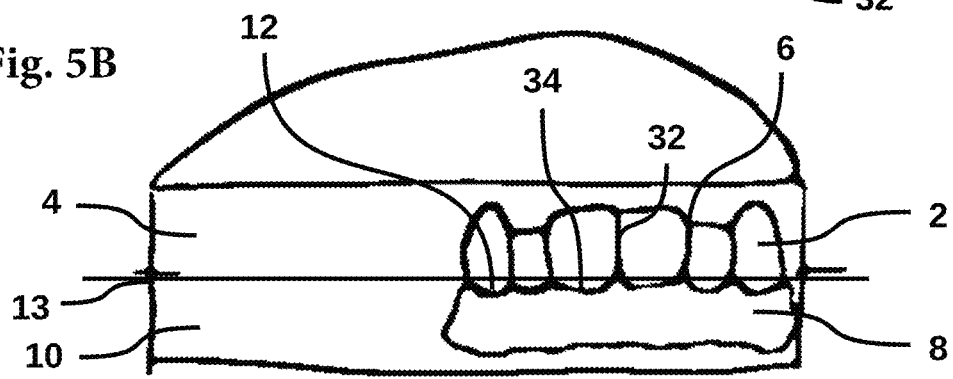
FIG. 5B shows a schematic section through the blank according to the invention in perspective view in a further embodiment with possible placement of a virtual maxillary anterior partial denture.
Figure 5C:
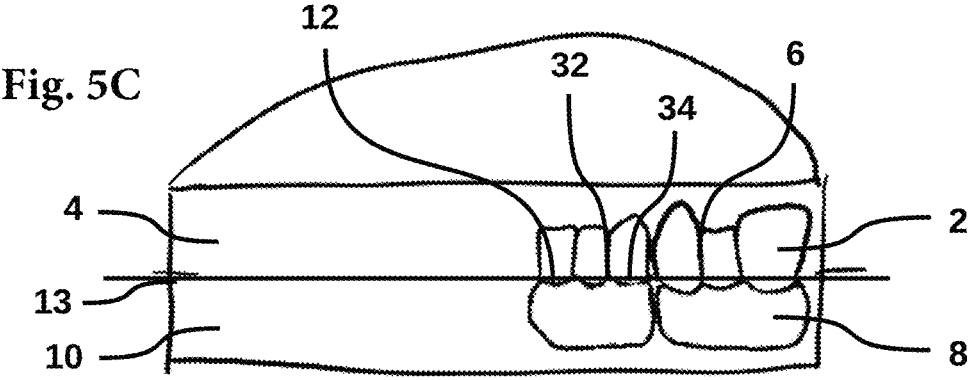
FIG. 5C shows a schematic section through blank according to the invention in perspective view in a further embodiment with possible placement of a virtual maxillary and mandibular anterior partial denture.
Figure 5D:
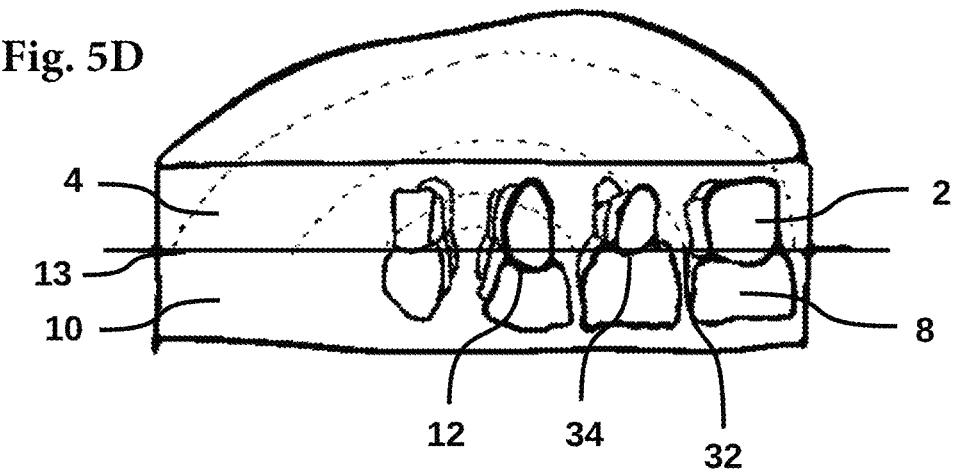
FIG. 5D shows a schematic section through the blank according to the invention in perspective view in a further embodiment with possible placement of several virtual maxillary and mandibular anterior partial denture components.

FIG. 5A to 5D show schematic sections through blanks according to the invention in perspective view in one embodiment each with possible placements of various virtual partial dentures. FIG. 5A shows a mandibular anterior segment from tooth 33 to 43, FIG. 5B a maxillary anterior segment from tooth 13 to 23 and FIG. 5C a disc, where a mandibular anterior segment from tooth 31 to 33 and a maxillary anterior segment from tooth 23 to 21 are positioned next to each other. By rotating virtual tooth/gingiva parts by 180° (in FIG. 5D), tooth segments can be made from all four anterior segments in the same blank. Of course, this does not only apply to anterior tooth segments as shown in FIG. 5A to 5C, but also to any other desired tooth segments which are to be manufactured from one blank.

In FIGS. 5A to 5C, the plane 13 in which the interface 12 between the teeth made of tooth-coloured material 4 and the denture base 8 made of flesh-coloured material 10 lies is shown in each case as a straight line in the side perspective.

FIG. 6A to 6D show schematic representations of possible embodiments of a posterior tooth block according to the invention in top view. Possible positioning of teeth 2 or tooth/gingiva parts, here in particular of posterior teeth, in the boundary layer 12 between the tooth-coloured material 4 and the flesh-coloured material 10 are drawn in two dimensions. These sections are chosen in such a way that in FIGS. 6A to 6D the area of the block, in particular the convergence area 21 in which the centre of the fan-shaped orientation line 38 lies, is in each case above and the edge of the block below the figure. The fan-shaped orientation lines 38 correspond to the elevations of the flesh-coloured material 34 and are located at connection points 6 between the individual teeth 2, i.e. the papillae.

The fan-shaped orientation lines 38 converge with each other, and the central area formed by the lines may also be referred to as the convergence area 21. The orientation of the orientation lines 38 allows the selection of an appropriate size of the tooth/gingiva portion, depending on its placement in the block.

As can be seen from FIG. 6A to 6D, tooth/gingiva parts that are machined, in particular milled, in the upper area of the block thus automatically have smaller dimensions than tooth/gingiva parts that are machined, in particular milled, at the bottom.

FIG. 6B to 6D show that blocks according to the invention can be manufactured in different sizes in order to achieve an even finer adjustment of the dimensions. For example, it is possible to produce blocks in sizes "L" for very large tooth/gingiva parts, "M" for average tooth/gingiva parts and "S" for very small tooth/gingiva parts.

FIGS. 6A to 6D also show an exemplary holder 36 which is used to clamp the tooth/gingiva for clamping the block according to the invention in the clamping device of the CAD/CAM device.

FIG. 7A to 7D show schematic representations of possible designs of a block according to the invention in top view. Possible positioning of teeth 2 or tooth/gingiva parts, here in particular anterior teeth, in the boundary layer 12 between the tooth-coloured material 4 and the flesh-coloured material 10 are drawn in two dimensions. These sections are chosen in such a way that in FIGS. 8A to 8D the centre is below and the edge of the block is above the figure in each case. The orientation lines 38 shown in the block are thus sections of an imaginary spiral or imaginary concentric circles which are considerably larger than the block. The orientation lines 38 serve to illustrate the increase in size of the section of the spiral 24 or the section of the concentric circles 28, which lie in the area of the block, from the centre 26 outwards, i.e. towards the edge of the block. As can be seen from FIG. 7A, dental gingiva parts that are machined, in particular milled, in the upper area of the block thus automatically have larger dimensions than dental gingiva parts that are machined, in particular milled, in the lower area of the block.

FIG. 7B to 7D show that blocks according to the invention can be manufactured in different sizes, so that the three tooth-gingiva parts shown in FIG. 7A, which are placed on one block, can also be manufactured on individual blank blocks which are narrower than the blank block.

FIGS. 7A to 7D also show an exemplary bar 36, which is used to clamp the block according to the invention in the clamping device of the CAD/CAM device.

FIGS. 8A to 8C show schematic representations of possible designs of a block according to the invention in top view. Possible positioning of teeth 2 or tooth-gingiva parts, here in particular of posterior teeth, in the boundary layer 12 between the tooth-coloured material 4 and the flesh-coloured material 10 are drawn in two dimensions. These sections are chosen in such a way that in FIGS. 8A to 8C the centre is on the left-hand side and the edge of the block is on the right-hand side of the figure in each case. The course of the concentric circles 28 according to the invention, which lie in the inventive interface 12 between the materials 4 and 10, is schematically drawn in the form of dashed lines.

The common centre 26 of the concentric circles 28 is located on the left side of the blank in the representation according to the figures. The distance between the concentric circles 28 increases in this embodiment from the inside, i.e. from the side of the block on which the imaginary centre point lies, to the outside, i.e. in the direction of the edge of the blank. As can be seen from FIGS. 8A to C, dental gingiva parts that are machined, in particular milled, in the outer area of the block thus automatically have larger dimensions than dental gingiva parts that are machined, in particular milled, near the centre of the block.

FIG. 8A to 8C further show that blocks according to the invention can be manufactured in different sizes in order to achieve an even finer adjustment of the dimensions. Here, for example, it is conceivable to enable blocks in sizes "L" for very large tooth-gingiva parts or tooth sizes overall, "M" for average-sized tooth-gingiva parts or tooth sizes and "S" for very small tooth-gingiva parts or tooth sizes overall.

FIGS. 8A to 8C also show an exemplary bar 36, which is used for clamping the block according to the invention in the clamping device of the CAD/CAM device. In this embodiment, it is attached to the side on which small tooth sizes can preferably be realised, i.e. near the imaginary centre of the interface.

FIG. 8D in combination with FIG. 8E illustrates that the block can also be oriented rotated. Thus, the bar 36, which serves to clamp the blank of the invention in the clamping device of the CAD/CAM device, is located on the other side of the blank in FIG. 8D than it is in FIGS. 8A to 8C.

FIG. 8E shows an example of the area of a virtual disc-shaped blank that can be formed as a rectangular block according to the invention. The virtual disc-shaped blank here has eccentric circles of elevations and depressions, as explained with reference to FIG. 2E above. It is understood that a disc-shaped blank does not have to be produced in real in order to work the block out of it, especially a rectangular one, but rather the desired area can be produced directly as a block-shaped blank. This illustration also shows possible placements of exemplary teeth 2 or tooth-gingiva parts.

Figure 9:
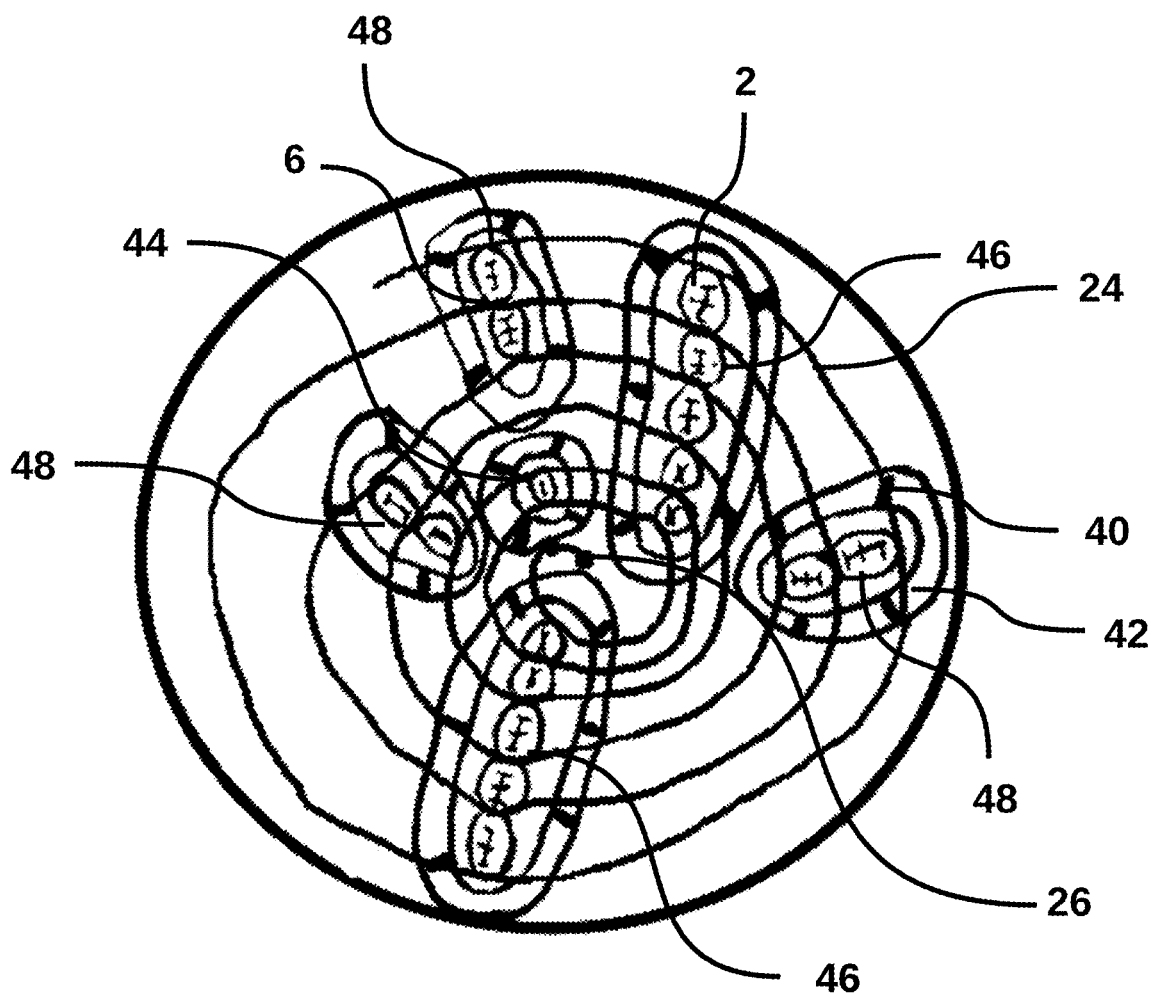
FIG. 9 shows a schematic representation of a design form of a disc-shaped blank according to the invention in top view and possible positioning of partial dentures of different sizes.

FIG. 9 shows a schematic representation of a possible design form of a disc-shaped blank according to the invention in plan view. Layers of several tooth-gingiva parts in a blank according to the invention, determined automatically and/or under user control by the control device, are shown. In the present example, these virtual tooth-gingiva parts are arranged partly obliquely, partly radially, in the blank. Single tooth-gingiva segments 44 are provided here, but any other type of tooth-gingiva parts is also possible. FIG. 9 shows examples of two-unit (48) and five-unit (46) tooth-gingiva parts.

It is envisaged that during the milling process, connecting webs 40 remain between the tooth-gingiva parts 1 to be produced and the rest of the blank, i.e. in the area of the milled joint 42, so that the tooth-gingiva parts 1 can be prevented from falling out during the milling process, even if the blank is rotated or tilted in three-dimensional space. This allows any conventional milling machine to be used for a blank according to the invention without requiring further special modifications to the milling machine.

The terms "about" and "substantially" are intended to include the degree of error or uncertainty associated with measurement of the particular quantity or shape as one of ordinary skill in the art would understand.

Some embodiments may involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, a personal computer microprocessor, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A dental blank comprising
an upper and a lower surface, which comprises a flesh-coloured material and a tooth-coloured material,
wherein the flesh-coloured material and the tooth-coloured material are bonded to one another,
wherein an interface between the materials with elevations and depressions formed in or at the interface extends through an optionally curved plane, which plane lies parallel to or obliquely to at least a part of the surfaces of the blank,
wherein the elevations and depressions are each formed, at least partially, circumferentially in the interface between the materials, the apex of each depression and/or elevation forming at least one line, the line running either in the form of one or more arithmetic or logarithmic spiral(s) or in the form of one or more circles.

2. The dental blank according to claim 1,
wherein the at least one line has a radius r, viewed from a centre point of the blank and represented by one or more of the following equations, where:

$$r = a\varphi \text{ or}$$

$$r = ae^{k\varphi} \text{ or}$$

$$r = a,$$

where a and k are each a natural number $\mathbb{R}$ and $\varphi$ is the angle of rotation.

3. The dental blank according to claim 2,
wherein a course of the depressions and/or elevations is the first derivative of one or more of the equations of the line with the radius r greater than or equal to zero and increases with increasing angle of rotation $\varphi$.

4. The dental blank according to claim 3,
wherein the course of the depressions and/or elevations has the form of concentric circles.

5. The dental blank according to claim 3,
wherein the course of the elevations and depressions are closer to each other near the centre of the blank and further apart from each other towards the outside or
wherein the course of the elevations and depressions are further apart from each other near the centre of the blank and closer to each other towards the outside.

6. The dental blank according to claim 3,
wherein the centre of the line or lines does not lie centrally in the plane of the interface between the materials, and is slightly displaced towards an edge in the plane of the interface and/or
wherein the course of the elevations and depressions has different distances on different sides of the centre.

7. The dental blank according to claim 3,
wherein the tooth-coloured material, and/or optionally the flesh-coloured material has a colour gradient and/or is continuously increasingly transparent with increasing distance from the interface between the materials.

8. A dental partial prosthesis made from the blank according to claim 1.

9. The dental partial prosthesis according to claim 8, wherein the teeth of the partial denture are at least partially integrally connected to one another via the tooth-coloured material to form a partial dental arch.

10. A block comprising
an upper and a lower surface comprising a flesh-coloured material and a tooth-coloured material,
wherein the flesh-coloured material and the tooth-coloured material are bonded to one another,
wherein an interface between the materials with elevations and depressions formed in or at the interface extends through an optionally curved plane, which plane is parallel to or oblique to at least part of the surfaces of the blank,
wherein the elevations and depressions, as seen in plan view of the interface, extend across the blank and which one or more lines are parallel to each other, circular, spiral or curved.

11. The block according to claim 10,
wherein the one or more lines extend in a fan-shaped, circular or spiral manner and converge to form a convergence region.

12. A method of manufacturing a dental partial prosthesis, using a CAD/CAM device, from a blank or a block which is manufactured with an upper and a lower disc surface, which is built up from a flesh-coloured material and a tooth-coloured material, wherein the flesh-coloured material and the tooth-coloured material are bonded to one another and wherein the interface between the materials with elevations and depressions formed in the interface extends through a plane, which plane lies parallel or curved or oblique to one of the disc surfaces of the blank or block, said method comprising
reserving a region in the blank or block for at least one partial prosthesis, which region extends over one or more elevations and depressions, and wherein the elevations and depressions are each formed, at least partially, circumferentially in the interface between the materials, the apex of each depression and/or elevation forming at least one line, the line running either in the form of one or more arithmetic or logarithmic spirals or in the form of one or more circles.

13. The method for manufacturing a dental partial prosthesis according to claim 12, comprising
producing a plurality of partial prostheses for different patients by milling out, from a blank, after scanning, each virtual creation of the prosthesis and virtual positioning in the blank.

14. The method for manufacturing a dental partial prosthesis according to claim 12,
wherein the blank has reference points for positioning in the CAD/CAM device and/or an individual identification mark, and/or wherein the control device stores the position of a manufactured prosthesis for each blank and determines the blank and/or the positioning on the blank for new partial prostheses to be manufactured, by a "nesting" method, in order to achieve maximum use of raw materials.

15. The method for manufacturing a dental partial prosthesis according to claim 14,
wherein the individual identification mark comprises a QR code or an RFID tag.

16. A method for manufacturing a dental partial prosthesis, using a CAD/CAM device, from a blank or a block made with an upper and a lower disc surface, which is built up from a flesh-coloured material and a tooth-coloured material, wherein the flesh-coloured material and the tooth-coloured material are bonded together and wherein the interface between the materials with elevations and depressions formed in the interface extends through a plane, which plane is parallel or curved or oblique to one of the disc surfaces of the blank or block,
wherein an area is reserved in the blank or block for at least one partial denture which extends over one or more elevations and depressions and
wherein the elevations and depressions are each formed, at least partially, circumferentially in the interface between the materials, the apex of each depression and/or elevation forming at least one line, the line running either in the form of one or more arithmetic or logarithmic spirals or in the form of one or more circles, and
wherein the CAD/CAM device defines the partial prosthesis in terms of spatial shape, and has a control device which, depending on the desired size and tooth width, positions the partial denture in the blank in such a way, and also proposes the individual tooth shape, the rotation and/or the angulation of the teeth, and optionally after user intervention.

* * * * *